(12) United States Patent
DeWitt

(10) Patent No.: US 6,173,705 B1
(45) Date of Patent: Jan. 16, 2001

(54) DEVICE FOR INTEGRATING A SKEET LAUNCHER TO A VEHICLE

(76) Inventor: George DeWitt, P.O. Box 126, Jackson, CA (US) 95642

(*) Notice: Under 35 U.S.C. 154(b), the term of this patent shall be extended for 0 days.

(21) Appl. No.: 09/272,696

(22) Filed: Mar. 18, 1999

(51) Int. Cl.⁷ ........................................ B60R 9/08
(52) U.S. Cl. ................ 124/1; 124/80; 224/503; 224/528; 280/769
(58) Field of Search ............. 124/1, 8, 80; 224/503, 224/533, 524, 528; 280/769

(56) References Cited

U.S. PATENT DOCUMENTS

| | | |
|---|---|---|
| 2,711,163 | 6/1955 | Richardson . |
| 2,925,077 | 2/1960 | Luebkeman . |
| 2,980,095 | 4/1961 | Hoag . |
| 3,677,257 | 7/1972 | Segerkvist . |
| 3,949,728 | 4/1976 | Gustafsson . |
| 4,381,069 | 4/1983 | Kreck . |
| 4,576,395 | 3/1986 | Longoria . |
| 4,770,155 | 9/1988 | Chamberlain et al. . |
| 4,867,356 | 9/1989 | Melby . |
| 4,934,894 * | 6/1990 | White .............................. 224/503 X |
| 5,226,622 | 7/1993 | LeAnna . |
| 5,330,084 | 7/1994 | Peters . |
| 5,397,147 | 3/1995 | Ducharme et al. . |
| 5,433,356 | 7/1995 | Russell . |
| 5,451,088 | 9/1995 | Broad . |
| 5,458,389 | 10/1995 | Young . |
| 5,469,998 | 11/1995 | Van Dusen et al. . |
| 5,489,110 | 2/1996 | Van Dusen . |
| 5,509,592 | 4/1996 | Lipka . |
| 5,540,537 | 7/1996 | Welch . |
| 5,547,116 | 8/1996 | Eckhart . |
| 5,593,139 | 1/1997 | Julian . |
| 5,649,656 | 7/1997 | Davy . |
| 5,658,033 | 8/1997 | Delaune . |
| 5,678,743 | 10/1997 | Johnson et al. . |
| 5,775,560 * | 7/1998 | Zahn et al. .......................... 224/524 |
| 5,803,330 * | 9/1998 | Stack et al. ...................... 224/533 X |

* cited by examiner

Primary Examiner—John A. Ricci
(74) Attorney, Agent, or Firm—Bernhard Kreten

(57) ABSTRACT

A support device for attaching a trap shooter to a vehicle, particularly a pick-up truck in, which a frame is affixed to a conventional square receiver located below the bumper on the pick-up truck, the frame projecting away from the truck and upwardly, and terminating in a platform upon which the trap shooter is located. The platform is capable of rotation and its spacing from the tailgate can be controlled to allow easy access by an operator for easy loading of disks carried on the pick-up truck body.

19 Claims, 5 Drawing Sheets

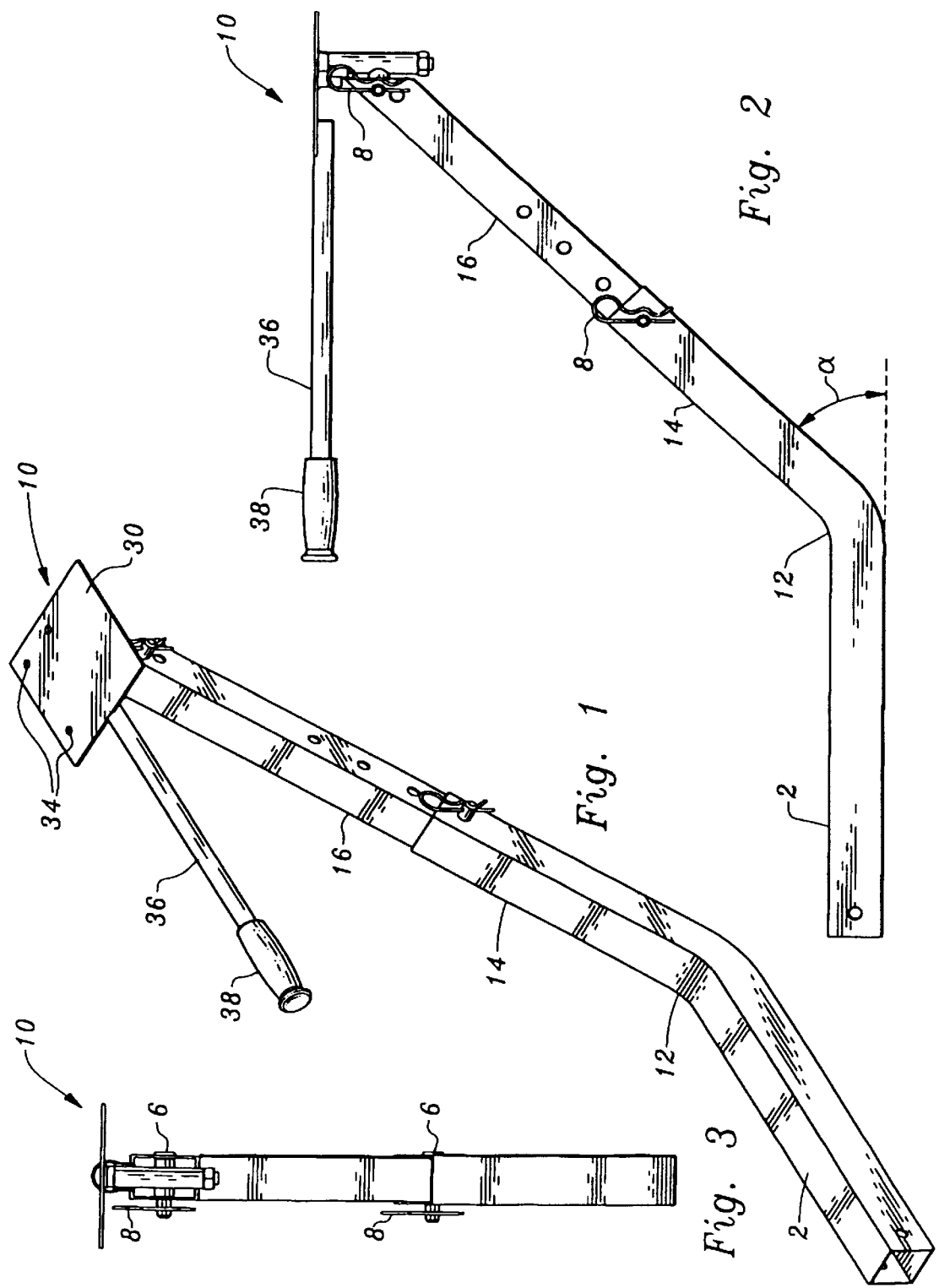

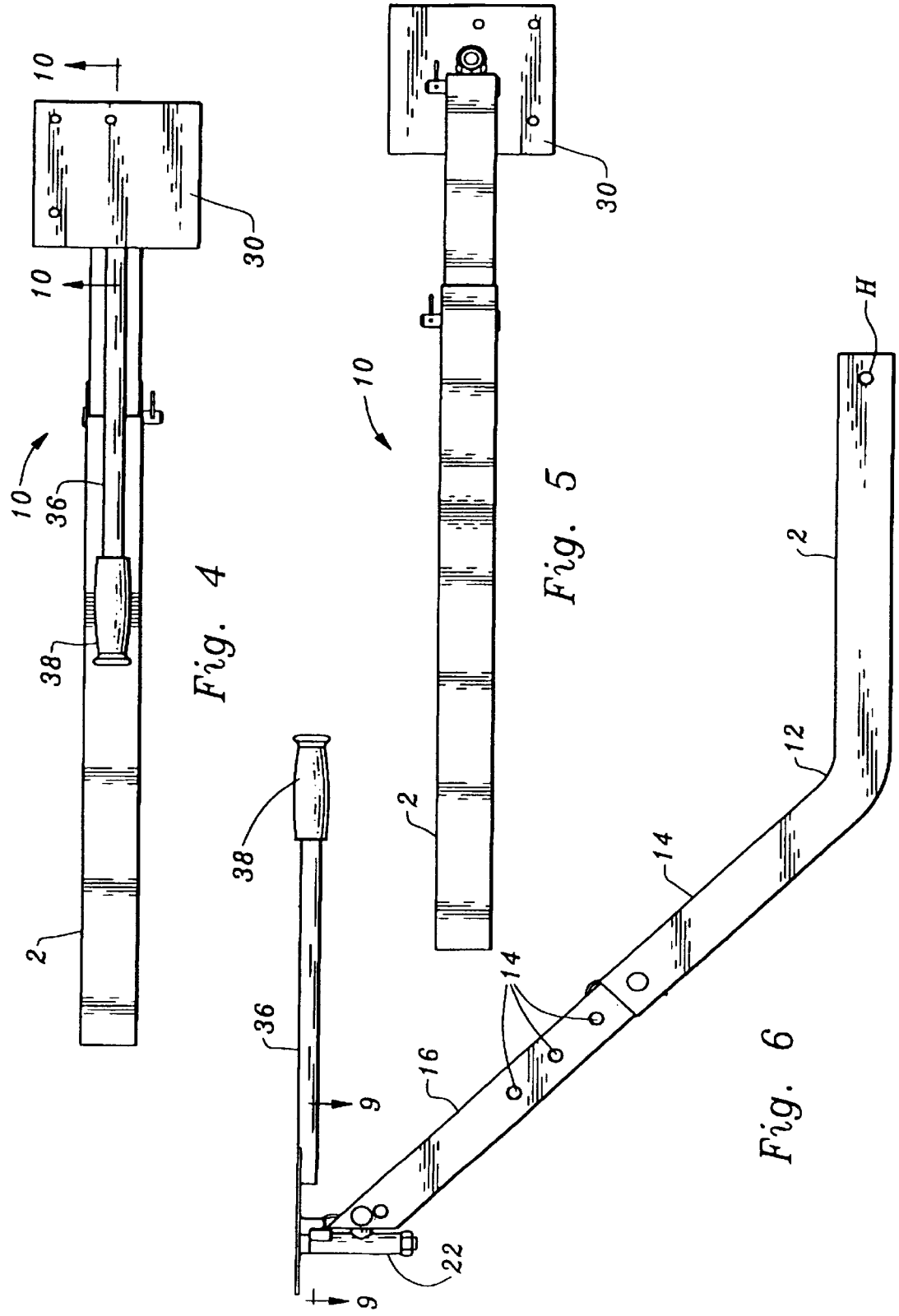

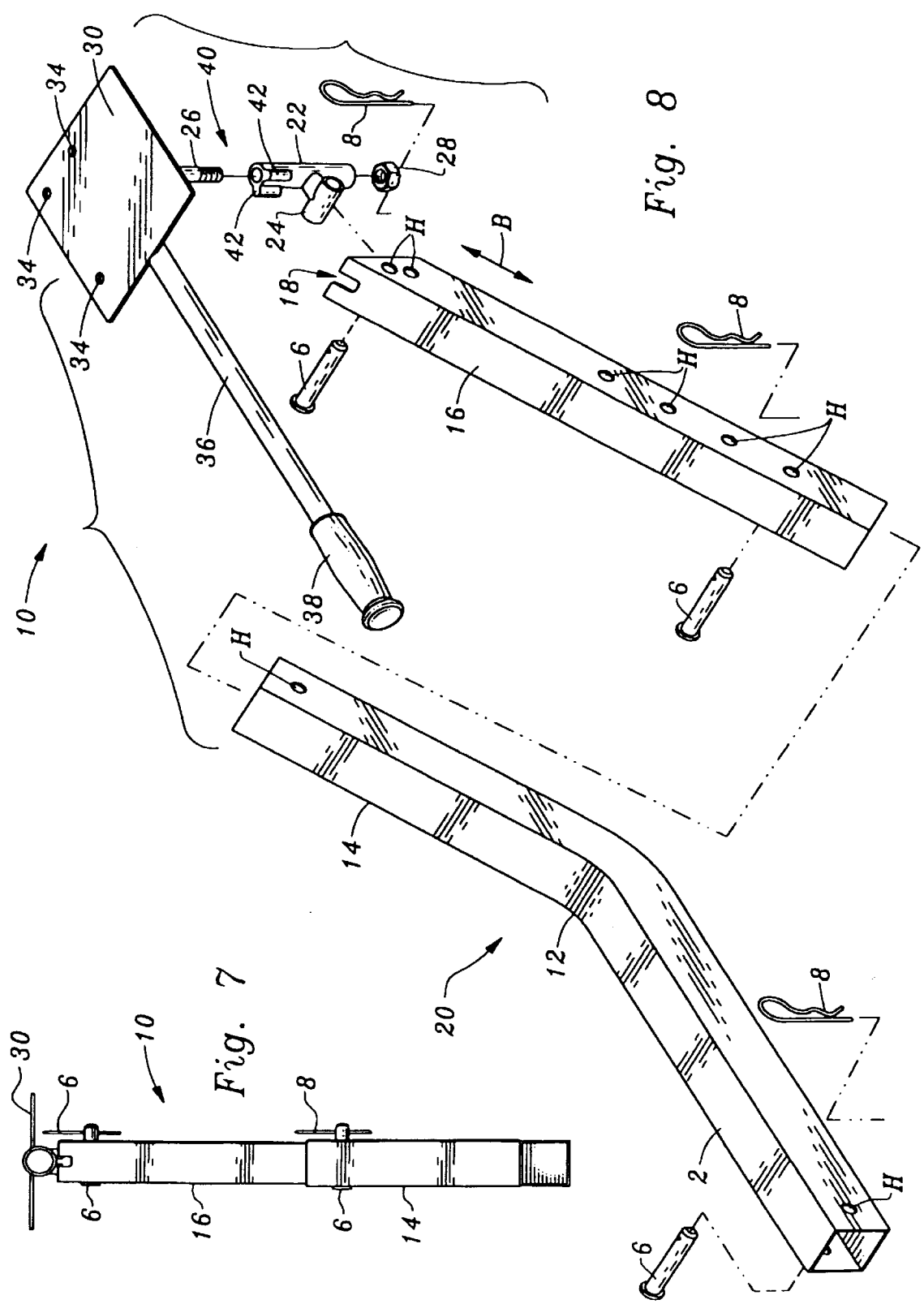

DEVICE FOR INTEGRATING A SKEET LAUNCHER TO A VEHICLE

FIELD OF THE INVENTION

The following invention relates generally to an instrumentality which allows a clay target throwing device to be supported adjacent a tailgate of a pick-up truck. More particularly, the instant invention is directed to a support which allows a clay target launcher to be securely mounted adjacent a payload area of a pick-up truck to facilitate reloading the launcher and to provide a secure, stable platform during target practice.

BACKGROUND OF THE INVENTION

Most clay target launchers (also known as clay pigeon launchers) are ground mounted. Stakes are imbedded in the ground and provide an upstanding projection upon which the launcher is deployed. Some launchers attach to spare tires mounted on the ground. Most of these type of devices react upon release of the clay target. Launchers rely on spring pressure to hurl the target which results in a reaction force that loosens the support or alters the trajectory of the launcher as a function of repeated use.

Moreover, such devices are typically deployed remote from a pick-up truck which is used to carry the clay targets. This makes set up some what more difficult and reloading time consuming since a person using the launcher is not comfortably reposed adjacent the launching device itself and the movement of clay pigeons is a laborious process because of the weight and the fragility of the clay pigeons themselves.

The following prior art reflects the state of the art of which applicant is aware and is included herewith to discharge applicant's acknowledged duty to disclose relevant prior art. It is stipulated, however, that none of these references teach singly nor render obvious when considered in any permissible combination the nexus of the instant invention as disclosed in greater detail hereinafter and as particularly claimed.

| PATENT NO. | ISSUE DATE | INVENTOR |
| --- | --- | --- |
| 2,711,163 | Jun. 21, 1955 | Richardson |
| 2,925,077 | Feb. 16, 1960 | Luebkeman |
| 2,980,095 | Apr. 18, 1961 | Hoag |
| 3,677,257 | Jul. 18, 1972 | Segerkvist |
| 3,949,728 | Apr. 13, 1976 | Gustafsson |
| 4,381,069 | Apr. 26, 1983 | Kreck |
| 4,576,395 | Mar. 18, 1986 | Longoria |
| 4,770,155 | Sep. 13, 1988 | Chamberlain, et al. |
| 4,867,356 | Sep. 19, 1989 | Melby |
| 5,226,622 | Jul. 13, 1993 | LeAnna |
| 5,330,084 | Jul. 19, 1994 | Peters |
| 5,397,147 | Mar. 14, 1995 | Ducharme, et al. |
| 5,433,356 | Jul. 18, 1995 | Russell |
| 5,451,088 | Sep. 19, 1995 | Broad |
| 5,458,389 | Oct. 17, 1995 | Young |
| 5,469,998 | Nov. 28, 1995 | Van Dusen, et al. |
| 5,489,110 | Feb. 6, 1996 | Van Dusen |
| 5,509,592 | Apr. 23, 1996 | Lipka |
| 5,540,537 | Jul. 30, 1996 | Welch |
| 5,547,116 | Aug. 20, 1996 | Eckhart |
| 5,593,139 | Jan. 14, 1997 | Julian |
| 5,649,656 | Jul. 22, 1997 | Davy |
| 5,658,033 | Aug. 19, 1997 | Delaune |
| 5,678,743 | Oct. 21, 1997 | Johnson, et al. |

The patent to Chamberlain, et al., teaches the use of a clay target throwing machine apparatus which is mounted on a towing ball hitch coupled with a vehicle or attached to the ground. The framework is coupled with an upright cylinder which engages the hitch ball allowing movement of the apparatus about the vertical axis of the hitch ball. Although this device allows articulated movement about the long axis of the cylinder which overlies the towing hitch ball, it can not alter the trajectory that the thrower can assume because it is fixed at a horizontal plane. Moreover, this device tends to react to the release of the spring allowing movement about the vertical axis of the cylinder and, for safety it should be constrained to offset the effect of the reaction of the spring on the launcher.

The patent to Melby teaches a use of a hitch mount for a clay pigeon shooter in which a hitch ball receives a sleeve which fits over and surrounds it. A pair of side members disposed in parallel spaced relation define a channel therebetween which receives a hitch tongue whereby the first and second side members overlie the tongue sides.

The other prior art listed above but not specifically described further catalog the prior art of which the applicant is aware. These references diverge even more starkly from the references specifically distinguished above.

SUMMARY OF THE INVENTION

The instant invention is distinguished over the known prior art in a multiplicity of ways. For one thing, the instant invention readily docks with a hollow receiver found on most pick-up trucks. This affords ease of installation and removal once the target shooting has ended.

In addition, the elevation and span from a trailing edge of a tailgate of the pick-up truck can be controlled and adjusted as suits the consumer so that it can be strategically deployed at a trailing edge of the tailgate allowing ready access to clay disks which are carried on the pick-up truck body and also to allow support for the operator of the launcher who can sit on the tailgate with a greater degree of comfort.

In addition, the instant invention can assume one of two modes: in the first mode, the launcher can be orientated by means of a handle which extends to a platform which supports the launcher and allows motion of the launcher not only side to side, but also up and down. In a second mode, the launcher is fixed in one position so that the person operating the launcher can also shoot the target with a weapon single handed.

A frame having a receiver end slidably telescopes within the receiver on the pick-up truck hitch. It is fixed by means of a locking pin and clip. The frame includes an upwardly projecting sleeve whose spatial relationship to the receiver can be adjusted. A platform is mounted on the sleeve of the frame and is so mounted that adjustment is provided to allow rotation of the platform about a vertical plane and also about a horizontal plane so that the launcher can be controlled as to the trajectory of the targets that are propelled therefrom.

OBJECTS OF THE INVENTION

Accordingly, there is a primary object of the present is to provide a new and novel vehicle support for a trap shooting launcher.

A further object of the present invention is to provide a device as characterized above which is capable of adjustment so that it can be strategically located adjacent a tailgate of the pick-up truck to which it is mounted allowing convenient deployment of subsequent targets and afford the operator a convenient vantage point from which to launch the clay targets.

A further object of the present invention is to provide a device as characterized above which is durable in construction, stable when deployed and safe to use.

A further object of the present invention is to provide a device as characterized above which lends itself to mass production techniques.

Viewed from a first vantage point it is an object of the present invention to provide a device for integrating a skeet launcher to a vehicle comprising, in combination: a frame projecting from the vehicle terminating in a platform, means to attach the launcher to the platform, and means to reorient the platform to alter skeet trajectories.

Viewed from a second vantage point it is an object of the present invention to provide a method for shooting, the steps including, attaching a support frame to a vehicle, attaching a launcher to a platform on the support frame, and orienting the platform to alter the launcher trajectory.

These and other objects will be made manifest when considering the following detailed specification when taken in conjunction with the appended drawing figures.

BRIEF DESCRIPTION OF THE DRAWINGS

FIG. 1 is perspective view of the apparatus according to the present invention.

FIG. 2 is a side view thereof.

FIG. 3 is a front view thereof.

FIG. 4 is a top plan view.

FIG. 5 is a bottom plan view.

FIG. 6 is a side view opposite FIG. 2.

FIG. 7 is an end view opposite FIG. 3.

FIG. 8 is an exploded parts view of the apparatus according to the present invention.

DESCRIPTION OF PREFERRED EMBODIMENTS

Figure 9:
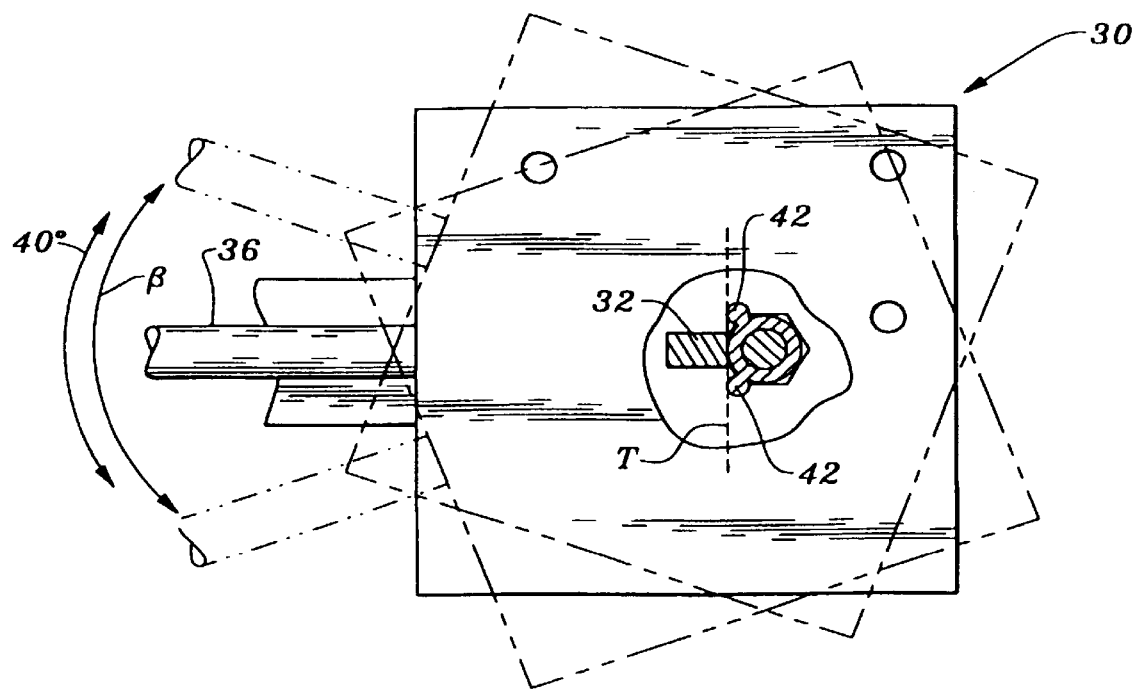
FIG. 9 is a sectional view taken along lines 9—9 of FIG. 6.

Considering the drawings, wherein like reference numerals denote like parts throughout the various drawing figures, reference numeral 10 is directed to the apparatus for supporting a trap shooter according to the present invention. In essence, the device (FIG. 8) can include a frame 20, a platform 30 and an adjuster 40.

More specifically, the frame 20 includes a square end 2×2 dimensioned to be received within a complementally formed receiver R and affixed thereby means of a locking pin 6 passing through a hole that both the receiver R and the receiver end 2 of the frame 20 share, the pin 6 having a bore fixed by means of a locking clip 8.

The receiver end 2 communicates with an elongate member substantially horizontally disposed and also square in section. It leads to a transition area 12 which causes the frame 20 to sweep upwardly at an angle alpha($\alpha$). Preferably, the angle alpha is 45 degrees. After the transition 12, the frame 20 extends upwardly and outwardly away from the pick-up truck and includes a free end 14 which receives both the platform 30 and adjuster 40 via a sleeve 16.

More particularly, the free end 14 receives within its square hollow, a height adjuster sleeve 16 which telescopes within the free end 14 and can be fixed at any elevation from a plurality of elevations as dictated by a plurality of holes H spaced along the long axis of the height adjuster sleeve 16 once one of the holes H is aligned with a hole H on a free end 14. The sleeve 16 and free end 14 are held in fixed relation by means of a locking pin 6 passing through the aligned holes and held in position by means of a locking clip 8. Thus, the frame 20 includes means for adjusting the horizontal elevation by the telescoping interrelationship of the sleeve 16 vis-a-vis the free end 14. An end of the sleeve 16 remote from the free end 14 includes a keyway 18 located on a top surface defined by a substantially rectangular cutout, for purposes to be assigned.

The platform 30 includes, on a bottom face thereof (please see FIG. 10), a downwardly projecting stud 26 which is slidably disposed within a tube 22 having, intermediately disposed on one side thereof, a spacer 23 which communicates and fixes a transverse sleeve 24. The free end of the stud 26 is fixed within the tube 22 by means of a nut 28. The amount of tension on the nut 28 controls the ease of rotation that the platform can experience about the angle beta (B) shown in FIG. 9, defining a first swivel. The transverse sleeve 24 defines a second swivel, is hollow and can be orientated to align with one of two holes H located within an upper interior hollow of the sleeve 16. The transverse sleeve 24 is held in rotatable relationship about a horizontal axis by means of a locking pin 6 passing through the sleeves and fixed thereby means of a locking clip 8. This permits rotation about the angle delta$\Delta$, approximately 30 degrees, with 15 degrees above the horizontal plane.

A key 32 is integrally formed with and projects from a bottom face of the platform 30. Had the lower of the two holes ($H_L$ of FIG. 10) been utilized rather than the one shown in FIG. 10, the key 32 would nest within the keyway 18 on the sleeve 16. When so oriented, the device has minimal rotation about the angle beta. When using the other hole (as shown), the angle of rotation is approximately 40 degrees with 20 degree angulation on either side of the support's long axis.

Figure 10:
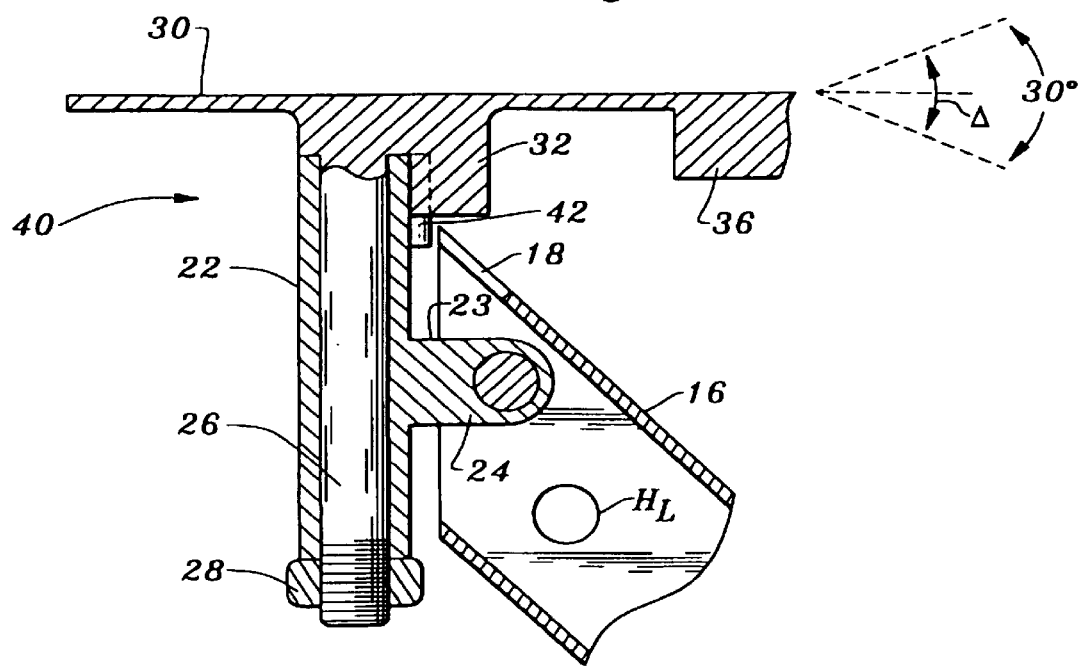
FIG. 10 is a sectional view taken along lines 10—10 of FIG. 4.

The maximum degree of angulation beta can be controlled by means of first and second stops 42 located on the tube 22 and spaced one from the other by the 40 degree relationship. The stops 42 are located on either side of the keyway 18. A straight tangent line T touches and aligns points on each of the stops 42 and tube 22. When the platform 30 is oriented in the hole as shown in FIG. 10, these stops 42 abut against the key 32 at extremes positions, limiting platform motion. Conversely, when the key 32 is nested within the keyway 18 by using hole $H_L$, this rotational feature is not utilized and the platform lends itself for utilization by a single individual for both launching the target and for shooting. As shown in FIG. 10, the ease with which the platform can be rotated about the angle beta is controlled by tension associated with the nut 28 on the stud 26 and is assisted by means of a handle 36 projecting over the frame 20 and more particularly the sleeve 16 and the free end 14. The handle 36 terminates in a hand grip 38 that allows the user to sit on the tailgate when opened and to rotate the platform about the angle beta.

The attitude of the platform 30 can also be controlled within an arc of approximately 30 degrees as shown by the angle delta in FIG. 10. By pushing up or down on the handle 36, the inclination of the platform 30 can be altered. This feature is available particularly when the transverse sleeve is mounted as shown in FIG. 10, but has minimal mobility to rotate when in hole $H_L$ because the key 32 abuts against the keyway 18.

Figure 11:
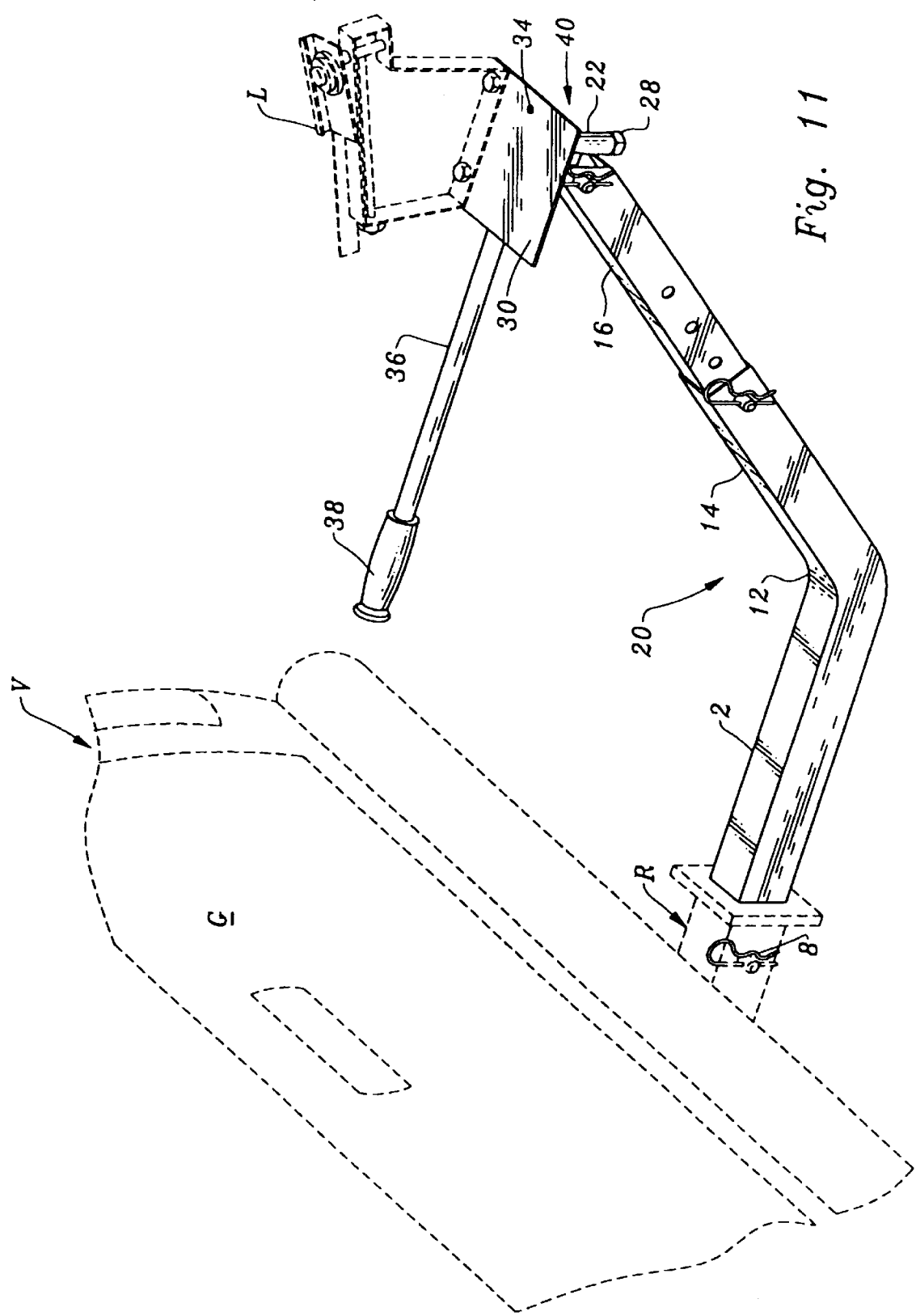
FIG. 11 is a perspective view of the apparatus deployed adjacent a tailgate on a pick-up truck with the launcher itself shown in phantom.

In use and operation, and referring to FIG. 11, the launcher L is supported on a top surface of the platform by locating fasteners to penetrate apertures 34 on the platform 30. Disassembly of the unit is the reverse of that described hereinabove.

Moreover, having thus described the invention, it should be apparent that numerous structural modifications and adaptations may be resorted to without departing from the scope and fair meaning of the instant invention as set forth hereinabove and as described hereinbelow by the claims.

What is claimed is:

1. A device for integrating a skeet launcher to a vehicle comprising, in combination:
   a frame projecting from the vehicle, terminating in a platform,
   means to attach the launcher to said platform,
   and means to reorient said platform to alter the angle of inclination of skeet trajectories.

2. The device of claim 1 wherein said means to reorient said platform includes a first swivel means allowing rotation about a first axis.

3. The device of claim 2 including a second swivel means allowing motion about a second axis including a transverse sleeve mounted between said frame and said platform.

4. The device of claim 3 wherein said second swivel means includes a vertically oriented tube which allows rotation between said platform and said frame.

5. The device of claim 4 including a stud projecting down from said platform into said tube.

6. The device of claim 5 including a locking pin projecting between said transverse sleeve and said frame.

7. The device of claim 6 including a key disposed on a bottom face of said platform and a keyway disposed on said frame allowing means to nest said key in said keyway to prevent rotation.

8. The device of claim 7 wherein said frame includes a receiver end dimensioned to nest within a receiver hitch on a vehicle, a transition member communicating between said receiver and a free end providing angulation of said frame from a lower elevation parallel to the receiver to a higher elevation and a sleeve telecopically constrained within said free end.

9. The device of claim 8 wherein said keyway is provided on said sleeve and said sleeve attaches to said transverse sleeve by means of a locking pin and clip.

10. The device of claim 9 wherein said receiver end attaches to the receiver by means of a locking pin and clip.

11. The device of claim 10 wherein a handle projects from an underside of said platform terminating in a grip to allow manipulation of said platform about said first and said second axis.

12. The device of claim 11 including mounting apertures on said platform for receiving the launcher.

13. The device of claim 12 wherein said stud which projects from a bottom surface of said platform is fixed to said tube by means of adjustable nut.

14. A method for shooting, the steps including:
    attaching a support frame to a vehicle,
    attaching a launcher to a platform on the support frame, and
    orienting the platform to alter at least the angle of inclination of the launcher trajectory.

15. A device for integrating a target launcher to a vehicle comprising, in combination:
    a frame projecting from the vehicle, terminating in a platform,
    means to attach the launcher to said platform,
    means to reorient said platform to alter target trajectories,
    wherein said means to reorient said platform includes a first swivel means allowing rotation about a first axis, and
    including a second swivel means allowing motion about a second axis including a transverse sleeve mounted between said frame and said platform.

16. A device for integrating a target launcher to a vehicle comprising, in combination:
    a frame projecting from the vehicle, terminating in a platform,
    means to attach the launcher to said platform,
    and means to reorient said platform to alter target trajectories,
    wherein said means to reorient said platform includes an inclination swivel means allowing rotation about an inclination axis.

17. A device for integrating a target launcher to a vehicle comprising, in combination:
    a frame projecting from the vehicle, terminating in a platform,
    means to attach the launcher to said platform,
    means to reorient said platform to alter target trajectories, and
    including a swivel means allowing motion about an axis to alter the angle of inclination between said frame and said platform.

18. A device for integrating a target launcher to a vehicle comprising:
    a frame projecting from the vehicle, terminating in a platform; and
    a means to articulate said platform about at least two axes.

19. A device for integrating a target launcher to a vehicle comprising:
    a frame projecting from the vehicle, terminating in a platform; and
    a means to articulate said platform about an angle of inclination.

* * * * *